United States Patent [19]

Eisenberg

[11] 4,224,391
[45] Sep. 23, 1980

[54] ELECTROLYTE FOR ZINC ANODE BATTERIES AND METHOD OF MAKING SAME

[75] Inventor: Morris Eisenberg, Mountain View, Calif.

[73] Assignee: Electrochimica Corporation, Mountain View, Calif.

[21] Appl. No.: 75,408

[22] Filed: Sep. 14, 1979

Related U.S. Application Data

[63] Continuation-in-part of Ser. No. 964,933, Nov. 30, 1978, abandoned, which is a continuation-in-part of Ser. No. 880,427, Feb. 23, 1978, abandoned.

[51] Int. Cl.$^3$ ............................................... H01M 6/04
[52] U.S. Cl. .................................... 429/203; 429/207; 429/229
[58] Field of Search ............... 429/206, 207, 203, 188, 429/33, 29, 46, 218, 229

[56] References Cited

U.S. PATENT DOCUMENTS

| | | | |
|---|---|---|---|
| 1,748,485 | 2/1930 | Kugel | 429/203 |
| 2,513,292 | 7/1950 | Denison et al. | 429/207 |
| 2,681,376 | 6/1954 | Denison et al. | 429/207 |
| 2,952,572 | 9/1960 | Johnson | 429/203 |
| 2,992,143 | 7/1961 | Clifford et al. | 429/203 X |
| 3,011,007 | 11/1961 | Evers et al. | 429/203 X |
| 3,672,996 | 6/1972 | Louzos | 429/207 |
| 3,849,199 | 11/1974 | Feuillade et al. | 429/199 |

*Primary Examiner*—Anthony Skapars
*Attorney, Agent, or Firm*—Robert B. Kennedy

[57] ABSTRACT

A battery having a zinc or zinc alloy anode, a metal oxide or hydroxide cathode and an alkaline electrolyte comprising a solution of a salt formed by the reaction of one or more acids selected from the group consisting of boric acid, phosphoric acid and arsenic acid with an alkali or earth alkali hydroxide present in a sufficient amount to produce a stoichiometric excess of hydroxide to acid in the range of 0.02 to 3.0 equivalents per liter.

18 Claims, No Drawings

ELECTROLYTE FOR ZINC ANODE BATTERIES AND METHOD OF MAKING SAME

REFERENCE TO RELATED APPLICATIONS

This is a continuation-in-part to U.S. Patent Application Ser. No. 964,933 filed Nov. 30, 1978, now abandoned, which was a continuation-in-part of U.S. patent application Ser. No. 880,427 filed Feb. 23, 1978, now abandoned.

BACKGROUND OF THE INVENTION

This invention relates generally to rechargeable batteries of the type which employ zinc as an anode active material and a metal oxide or hydroxide as an active cathode, and particularly to electrolytes for use with such batteries.

Because of the solubility in acid or neutral media of metal oxide and hydroxide cathode active materials, it is necessary to employ alkaline solutions as the electrolyte in such batteries. Typical examples of these batteries are silver oxide-zinc systems, nickel oxide-zinc systems, and manganese dioxide-zinc systems.

Conventionally batteries of the type just described employ solutions of sodium hydroxide or potassium hydroxide as an alkaline electrolyte. Though the performance of the oxide or hydroxide cathode with these electrolytes is satisfactory, the same is not true of zinc anodes, especially in the case of rechargeable batteries. This is due to the fact that upon discharge of the zinc anode, zinc oxide and hydroxide products are formed at the anode. These products are soluable in the electrolyte which results in a major dissolution of the anode discharged products. When charging is subsequently employed, difficulties in the mass transfer of the zinc arise since most of the zincate is not within the porous body of the zinc anode but rather outside in the electrolyte body and in the separators due to its solubility. This, in turn, leads to a tendancy for electrodeposition to occur at the outer surfaces and points of the zinc anodes resulting in needle-like and tree-like dentritic deposits which are usually non-adherent and penetrate the separators in the battery. After a number of cycles such deposits progressively lead to failure of the battery through internal short circuiting.

Another result of the solubility of the zinc anode product formed during discharge is the redistribution of the zinc within the cell, usually towards the lower part of the electrode due to the gravity field effect. With repeated cycling the zinc material deplates from the top portions and deposit heavily on the bottom portions of the anodes. This results in what is known generally as "shape change". These phenomena can also lead to cell short circuiting and capacity losses due to material non-adherance.

Modifications of the alkaline electrolyte have been described from time to time for certain purposes. For instance, the salting out effect of additions of sodium ethylate, boric acid and zincates has been suggested for removal of small amounts of silver ions entering the electrolyte from the positive plate in a silver oxide or silver peroxide-zinc battery. This has been done to protect zinc anodes from reacting with the silver ions or colloidal particles which would lead to their destruction by a "local action" corrosion mechanism. For example, U.S. Pat. Nos. 2,513,292 and 2,681,378 illustrate additions of a number of materials for salting out purposes. Here, sodium ethylate, zincates and boric acid is employed to control the silver migration problem. The electrolyte remains strongly alkaline and the concentration levels of the additives are relatively minor compared to that of the alkali hydroxides. Indeed, an excess of hydroxide on the order of some 10.4 to 12.8 equivalents per liter is used. This, however, does not significantly suppress zinc or zinc alloy anode dentritic electrodeposition nor "shape change" from occuring during cycling in the battery.

SUMMARY OF THE INVENTION

It has now been discovered that employment of electrolytes which contain salts of strong alkali or earth alkali hydroxides with weak acids, with a slight excess of hydroxide and a pH value of between 9 and 14, substantially reduces the solubility of the zinc anode products. Such electrolytes substantially eliminate the dual problems of shape-charge and dendric deposition. At the same time the electrolytes are still sufficiently alkaline to provide satisfactory performance of the cathode materials. It has also now been found that electrolytes prepared from a mixture of alkali or earth alkali metal hydroxide solutions in water and boric acid, phosphoric acid or arsenic acid with excess hydroxide ranging from 0.02 to 3.0 equivalents per liter of solution produces highly favorable anode performance. The electrolyte can be prepared either from prior prepared salts with additions of small amounts of hydroxide within the above limits or by the reaction of appropriate stoichiometric amounts of the above mentioned weak acids in situmwith appropriately limited chemical equivalent excess of hydroxide.

In one preferred form of the invention an electrolyte is provided for a battery having zinc or zinc alloy as an active anodic material and a metal oxide or hydroxide as an active cathodic material. The electrolyte is alkaline and is formed from an alkali or earth alkali metal hydroxide mixed with an acid selected from the group consisting of boric acid, phosporic acid and arsenic acid to produce a slight excess of hydroxide not to exceed 3.0 equivalents per liter of solution.

In another preferred form of the invention a method is provided for making an electrolyte for a battery having a zinc anode and a metal oxide or hydroxide cathode which includes the step of mixing an acid selected from the group consisting of boric acid, phosphoric acid and arsenic acid with an alkali or earth alkali metal hydroxide in proportion to achieve an electrolyte pH value of from 9 and 14 and an excess of hydroxide not to exceed 3.0 equivalents per liter.

DESCRIPTION OF THE PREFERRED EMBODIMENTS

EXAMPLE 1

An electrolyte was prepared from an 8.08 moles per liter, (8.08 chemical equivalents per liter) solution of potassium hydroxide to which boric acid was added in the amount of 2.50 moles per liter (7.50 chemical equivalents per liter.) This provided formation of a solution of 2.50 moles per liter of potassium borate and 0.58 moles per liter of excess potassium hydroxide. Small nickel-zinc cells (2.0 ampere hours in capacity) were filled with this electrolyte. For comparison another group of three cells of the same construction was filled with an electrolyte containing 8.08 moles per liter potassium hydroxide. Both groups of cells were then charged up slowly and subsequently subjected to continuous discharge cycling. Specifically, the cells were cyclicly discharged for four hours and charged for eight hours. The cells were deliberately built with a thin, light weight separator system employing only two layers of the one mil thick porous polyethylene barrier separator in order to accelerate battery failures to produce differences in behavior between the two groups of cells at an early stage. After twenty-seven cycles two of the three cells containing only the potassium hydroxide (8.08 moles per liter) failed by internal short circuiting as evidenced by rapid self discharge while the third one failed at the thirty-first cycle. The cells filled with the new electrolyte on the other hand, which contained potassium borate and potassium hydroxide, performed well, failing only after running 109 to 116 cycles. In this example the electrolyte salt was formed in situ by mixing hydroxide with the weak acid in the solution. In the following examples 2–5 a solution of the prior prepared salt in water was made to which a small stoichiometric excess of the free hydroxide was added.

EXAMPLE 2

Here a solution was employed containing 2 m/L of potassium borate ($K_3BO_3$) corresponding to 6 equiv/L. To this was added 0.5 m/L, or 0.5 Equiv/L, potassium hydroxide.

EXAMPLE 3

Here 2.5 m/L (7.5 equiv/L) of potassium borate was dissolved in water to which was added 0.1 equiv/L of potassium hydroxide.

EXAMPLE 4

In this example a concentration of 3.0 m/L (3.0 Equiv/L) sodium metaborate ($NaBO_2$) was prepared to which was added 0.5 m/L (0.5 equiv/L) potassium hydroxide.

EXAMPLE 5

Here potassium phosphate was dissolved to a concentration of 2.0 m/L (6.0 equiv/L) to which was added 2.6 equiv/L of potassium hydroxide.

EXAMPLE 6

A sixth solution was formed in situ by the reaction of an 8.0 molar solution of sodium hydroxide (8 equiv/L) to which was added 2.5 m/L (7.5 equiv/L) or boric acid resulting in a free alkali excess of 0.5 m/L.

EXAMPLE 7

In this case the solution was prepared with a significantly larger excess of alkali hydroxide by mixing an 8.0 m/L (8 equiv/L) solution of sodium hydroxide with an addition of 1.0 m/L (3.0 equiv/L) of boric acid resulting in a large free hydroxide excess of 5.0 equiv/L.

With the solutions of Examples 2–6 improvements in cycle life were obtained ranging by a factor of 2.2 to 3.5 over a control group containing only a potassium hydroxide electrolyte tested in small nickel oxide-zinc cells with light weight separators. With the solution of Example 7 having a large excess of hydroxide however no improvement in cycle life was found. Apparently an initial hydroxyl ion concentration is needed for optimum performance of the battery with a high level of activity and both cathode and anode. On the other hand an excess of hydroxyl ion concentration is not desirable since it encourages dendrite formation and anode shape change. Earth alkali hydroxides such as calcium hydroxide have also been found to provide acceptable results here although the alkali metal hydroxides are superior.

It should be understood that the just described embodiments merely illustrate principles of the invention in selected preferred forms. Many modifications, additions, and deletions may, of course, be made thereto without departure from the spirit and scope of the invention as set forth in the following claims.

What is claimed is:

1. A battery having an anode, a cathode and an electrolyte with the anode having zinc or a zinc alloy as an active anodic material, the cathode having a metal oxide or hydroxide as an active cathodic material, and the electrolyte comprising a solution of a salt formed by the reaction of one or more acids selected from the group consisting of boric acid, phosphoric acid and arsenic acid with an alkali or earth alkali hydroxide present in an amount to produce a stoichiometric excess of said hydroxide to said acid in the range of 0.02 to 3.0 equivalents per liter.

2. A battery in accordance with claim 1 wherein said electrolyte has a minimum pH value of 9.

3. A battery in accordance with claim 1 wherein said electrolyte has a pH value of between 9 and 14.

4. A battery in accordance with claim 1 wherein said electrolyte salt is selected from the group consisting of potassium borate, potassium metaborate, sodium borate, sodium meta-borage, potassium phosphate, potassium metaphosphate, sodium phosphate, sodium metaphosphate, potassium arsenate, potassium meta-arsenate, sodium arsenate and sodium meta-arsenate.

5. A battery in accordance with claim 1 wherein said hydroxide is potassium hydroxide.

6. A battery in accordance with claim 1 wherein said hydroxide is sodium hydroxide.

7. A battery in accordance with claim 1 wherein said electrolyte comprises approximately 5.4 equiv/Liter of potassium hydroxide and from 2.4 to 5.38 equiv/liter of boric acid.

8. A battery in accordance with claim 1 wherein said electrolyte comprises 6.0 equiv/liter of potassium hydroxide, 0.10 to 0.30 equiv/liter lithium hydroxide, and from 5.6 to 6.0 equiv/liter of said acid.

9. The method of making an electrolyte for a battery having a zinc anode and a metal oxide or hydroxide cathode which includes the step of mixing an acid selected from the group consisting of boric acid, phosphoric acid and arsenic acid with an alkali or earth alkali metal hydroxide in proportion to achieve an electrolyte having a pH value of from 9 to 14 with a stoichiometric excess of hydroxide in the range of 0.02 to 3.0 equiv/liter.

10. An electrolyte for a battery made in accordance with claim 9.

11. A battery having a zinc anode, a metal oxide or hydroxide cathode and the electrolyte of claim 10.

12. The method of making an electrolyte in accordance with claim 9 wherein the acid is mixed with an hydroxide selected from the group consisting of potassium hydroxide, sodium hydroxide, lithium hydroxide and mixtures thereof.

13. An electrolyte for a battery made in accordance with claim 10.

14. A battery having a zinc anode, a metal oxide or hydroxide cathode and the electrolyte of claim 13.

15. The method of making an electrolyte in accordance with claim 9 wherein a hydroxide selected from the group consisting of sodium hydroxide and potassium hydroxide is mixed with boric acid in a concentration range of from 5 to 9 equiv/liter hydroxide to 2.0 and 8.98 chemical equivalents of said acid, the stoichiometric excess of the hydroxide being in the range of 0.02 to 3.00 equiv/liter.

16. The method of making an electrolyte in accordance with claim 9 wherein an hydroxide selected form the group consisting of potassium hydroxide, sodium hydroxide, lithium hydroxide and mistures thereof, at a concentration of approximately 8.0 equiv/liter is mixed with said acid at a concentration of approximately 7.5 equiv/liter.

17. The method of making an electrolyte in accordance with claim 9 wherein potassium hydroxide at a concentration of approximately 8.25 equiv/liter is mixed with boric acid at a concentration of approximately 8.1 equiv/liter.

18. The method of making an electrolyte in accordance with claim 9 wherein potassium hydroxide at a concentration of 8.0 equiv/liter and calcium hydroxide at a concentration of 0.25 equiv/liter is mixed with boric acid at a concentration of approximately 8.1 equiv/liter.

* * * * *